(No Model.) 5 Sheets—Sheet 1.
D. J. FARMER.
HORSESHOE MACHINE.
No. 331,624. Patented Dec. 1, 1885.
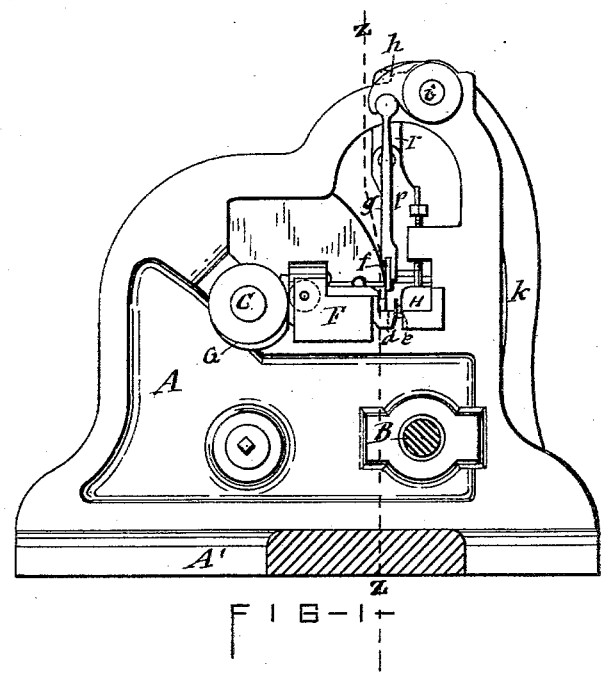
FIG-1-
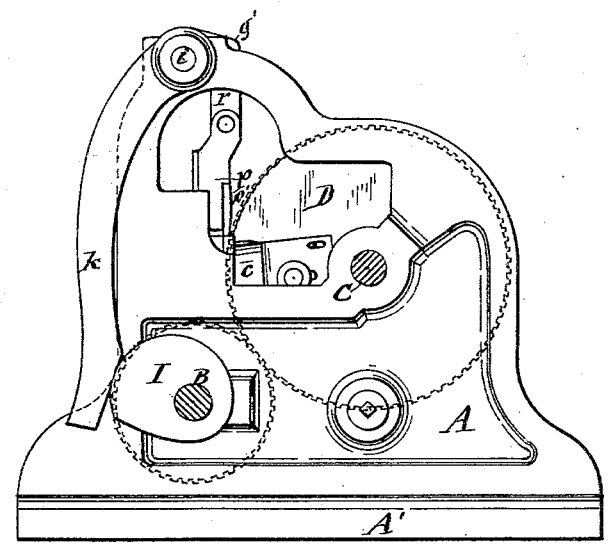
FIG-2-
ATTEST—
Wm. C. Raymond
C. Bendixon
INVENTOR—
David J. Farmer
per Dudley Lassett
his Atty (No Model.)  
D. J. FARMER.  
HORSESHOE MACHINE.  
No. 331,624.  
5 Sheets—Sheet 2.  
Patented Dec. 1, 1885.
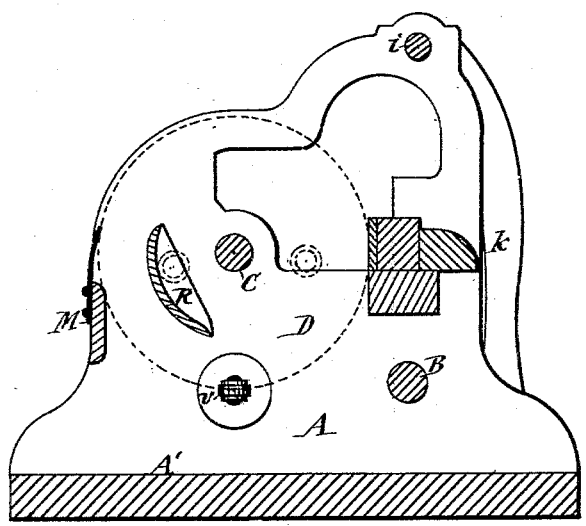
FIG-4-
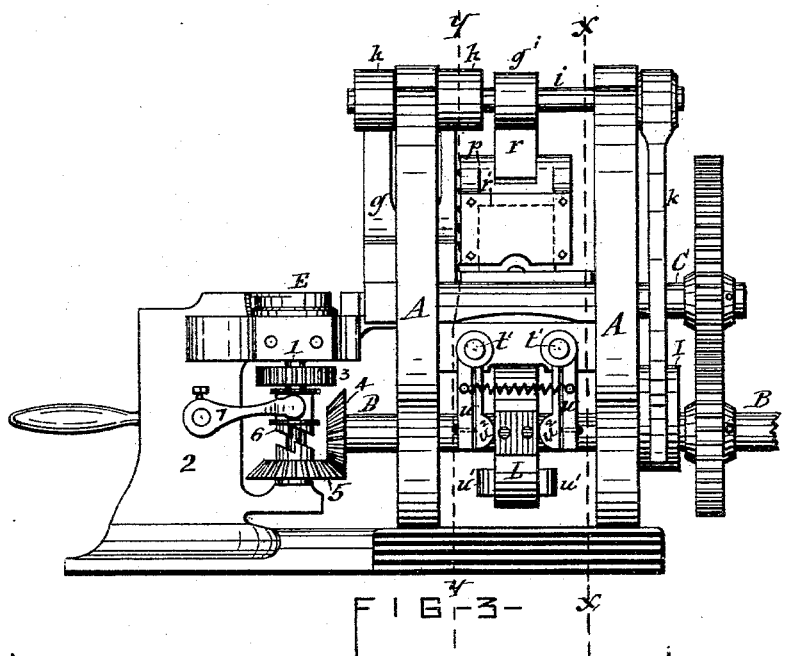
FIG-3-
ATTEST—  
Wm. C. Raymond  
C. Bendixen  
INVENTOR—  
David J. Farmer  
per Dudley, Lass & Wm  
his Attys (No Model.)
D. J. FARMER.
HORSESHOE MACHINE.
No. 331,624.
5 Sheets—Sheet 3.
Patented Dec. 1, 1885.
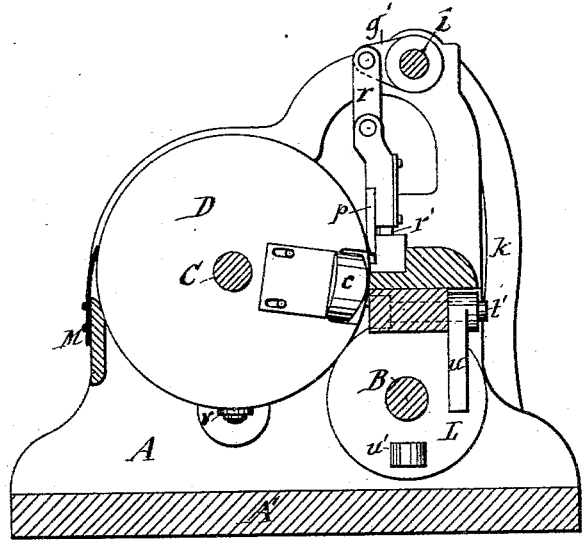
FIG-5-
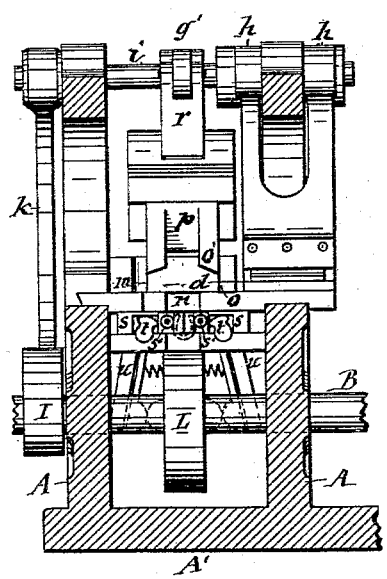
FIG-6-
ATTEST—
INVENTOR—
David J. Farmer (No Model.) 5 Sheets—Sheet 4.
D. J. FARMER.
HORSESHOE MACHINE.
No. 331,624. Patented Dec. 1, 1885.
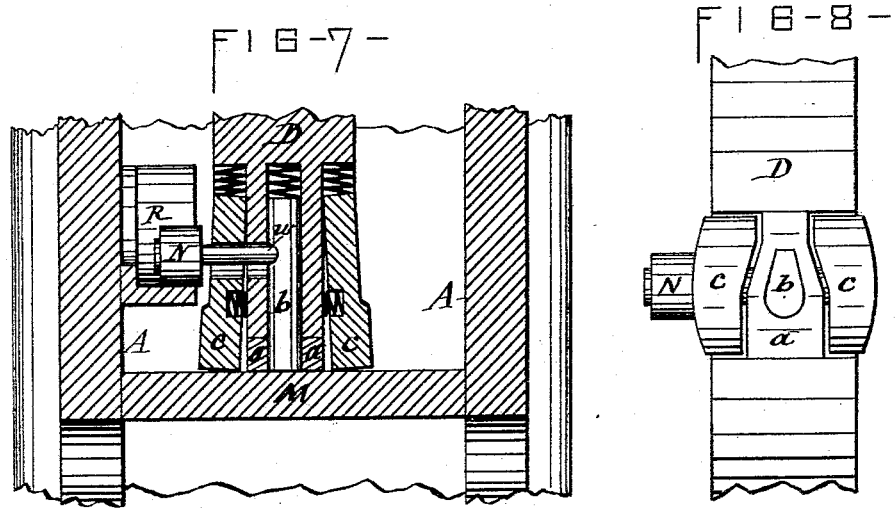
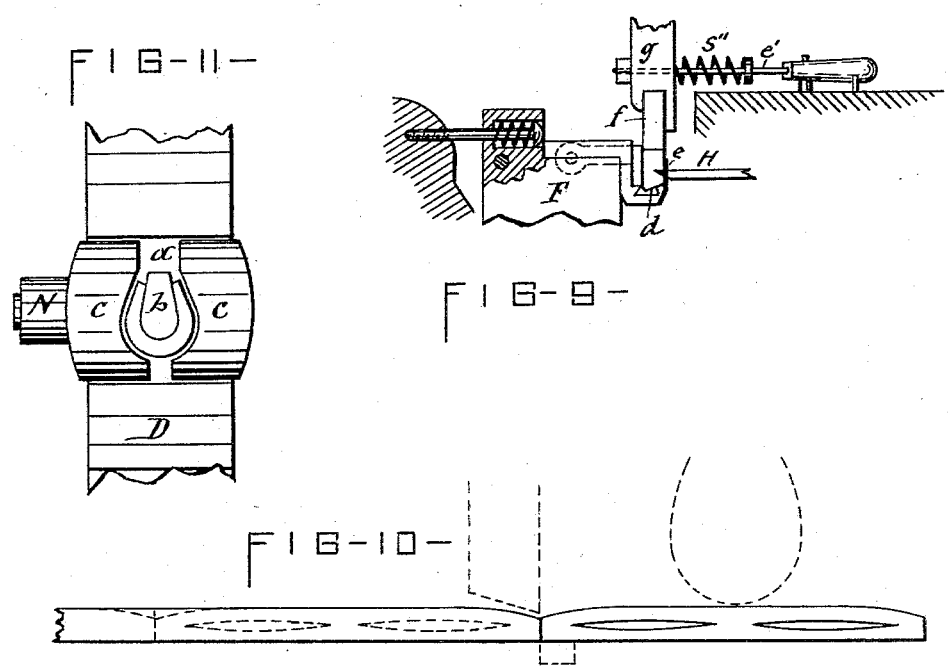
ATTEST—
Wm. C. Raymond
C. Bendixon
INVENTOR—
David J. Farmer
per Dudly Lacest &c
his Attys (No Model.) 5 Sheets—Sheet 5.
D. J. FARMER.
HORSESHOE MACHINE.
No. 331,624. Patented Dec. 1, 1885.
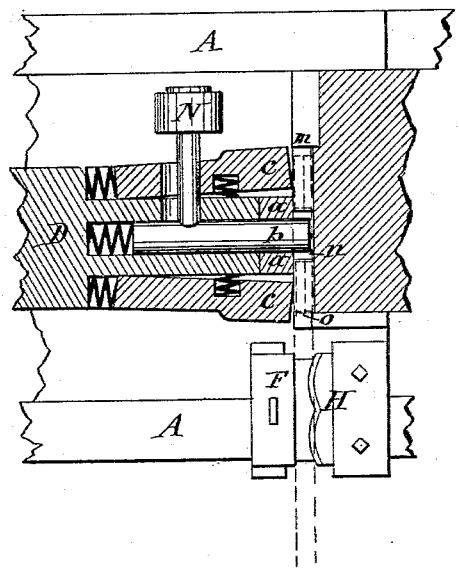
FIG-12-
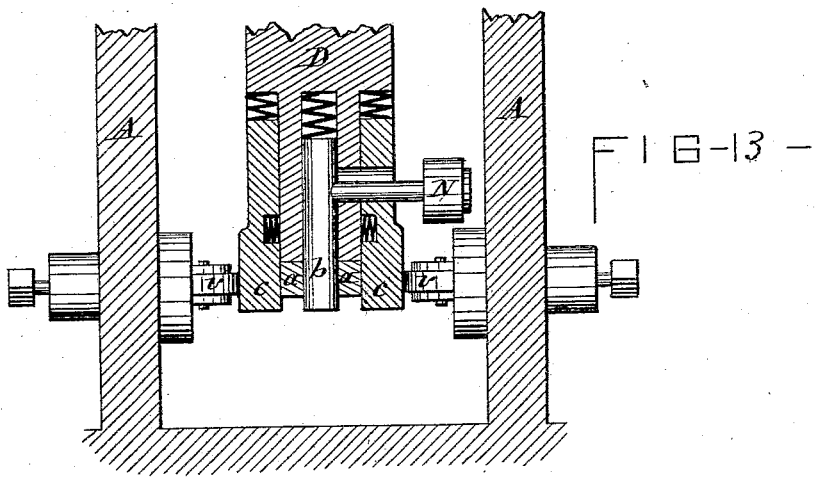
FIG-13-
ATTEST—
William C. Raymond.
C. Bendixon.
INVENTOR—
David J. Farmer
per Duell, Laass & Hy
his Attys

UNITED STATES PATENT OFFICE.

DAVID J. FARMER, OF PENN YAN, ASSIGNOR OF ONE-HALF TO R. NELSON GERE, OF SYRACUSE, NEW YORK.

HORSESHOE-MACHINE.

SPECIFICATION forming part of Letters Patent No. 331,624, dated December 1, 1885.

Application filed June 11, 1884. Serial No. 134,563. (No model.)

*To all whom it may concern:*

Be it known that I, DAVID J. FARMER, of Penn Yan, in the county of Yates, in the State of New York, have invented new and useful Improvements in Horseshoe-Machines, of which the following, taken in connection with the accompanying drawings, is a full, clear, and exact description.

My present invention relates to the same class of horseshoe-machines shown in the patent granted to me and S. Farmer on the 28th day of June, 1881, and to which also pertains the invention set forth in my pending application for Letters Patent filed April 23, 1884, Serial No. 128,900.

The differentiating features consist, chiefly, in the substitution of a rotary or continuously-operating die and former carrier for an oscillatory or intermittently-operating die and former carrier, and in different auxiliary and actuating mechanisms employed in connection with said rotary carrier, thereby producing an efficient and rapidly and continuously operating machine for the manufacture of horse and mule shoes complete from the bar.

The invention is fully illustrated in the annexed drawings, wherein Figures 1 and 2 are elevations of opposite sides of the machine. Fig. 3 is a front end view of the same. Fig. 4 is a vertical longitudinal section on line $x\,x$, Fig. 3, showing the rollers for actuating the shoe-compressing jaws and the means for throwing the completed shoe off from the wheel on which it is formed. Fig. 5 is a vertical longitudinal section on line $y\,y$, Fig. 3, facing the wheel carrying the shoe-former and the co-operating devices adjacent to the periphery thereof. Fig. 6 is a vertical transverse section on line $z\,z$, Fig. 1, and showing the devices in front of the wheel which carries the shoe-former. Fig. 7 is a transverse section of that portion of the wheel which carries the shoe-former, and illustrating more fully the means for throwing the complete shoe off from said wheel. Fig. 8 is a detached face view of that portion of the wheel which carries the shoe-former, die, and compressing-jaws. Fig. 9 is a detail view of the mechanism for preliminarily creasing and shaping the bar from which the shoe is to be formed. Fig. 10 is an edge view of a bar creased and shaped as aforesaid. Fig. 11 illustrates a modification of the construction shown in Fig. 8, and consists of jaws encircling the shoe and actuated in the same manner; and Figs. 12 and 13 are sectional views illustrating, respectively, the operation of the revolving shoe-former with the creaser and knives, and the operation of the devices for laterally compressing the shoe.

Similar letters of reference indicate corresponding parts.

A represents the supporting-frame of the machine, said frame consisting, chiefly, of two rigid walls rising from a bed, A', which is to be firmly secured to a suitable foundation.

B is the main shaft, journaled in suitable bearings in the forward and lower portion of the walls A A. Another shaft, C, arranged across the rear portion of the frame A, receives rotary motion from the main shaft by appropriate gearings connecting said shafts.

Between the two walls A A is a wheel, D, firmly secured to the shaft C, and carrying in its periphery one or more sets of the usual die, $a$, and shoe-former $b$, which latter is seated in a cavity in the die, and held yieldingly in an outward-projecting position by a spring bearing against the inner end of the former $b$. Laterally and longitudinally movable jaws $c\,c$ are arranged at the outer sides of the die $a$, to laterally compress the shoe, as hereinafter described. Across the face of the wheel D is arranged the way or guide-channel $d$, for carrying the bar from which the shoe is to be formed, said bar being fed to the machine by horizontal rolls E, arranged diametrically opposite each other to grasp between their peripheries the bar from which the shoe is to be formed, said peripheries being mutilated to produce an intermittent feed, the perfect portion of the peripheries being of a length corresponding to the length of the blank required to produce the shoe, said feed-rolls being rotated synchronously and in opposite directions by pinions 3, of equal dimensions, attached to the arbors 1 1 of the rolls.

A miter-gear, 4, is attached to the end of the main shaft B, and engages a miter-gear, 5, loosely connected to one of the arbors 1. A clutch, 6, slides on a feathered portion of the aforesaid arbor, and is adapted to interlock with the hub of the loose gear 5, which receives a continuous motion from the main shaft B. By means of a lever, 7, pivoted on the pedestal 2, and connected at one end with the clutch 6, and having the opposite end in position to be conveniently operated by the attendant of the machine, the clutch can be thrown in or out of connection with the miter-gear 5, to start or stop the feed-rolls, as may be desired.

The operation of the machine, however, is not dependent on the specific feed mechanism herein shown and described, as the intermittent feed of the bar to the machine can be effected by other well-known mechanisms, and the feed-rolls can be arranged vertically to grip the bar edgewise.

As the bar enters the feed-channel $d$ it is first subjected to the creasing and shaping or swaging operation, which is effected by the slide F, which is mounted on the wall A, and receives a reciprocating motion by a cam, G, on the end of the shaft C, which cam forces the slide toward the usual creaser, H, secured to the frame A opposite to the slide. A spring connecting the rear end of the slide with the frame A retracts the slide after it is released from the cam G, and in this latter movement of the slide the bar is drawn away from the creaser by hooked plates $e$, connected with the slide, and reaching across the bar and taking hold of the side thereof adjacent to the creaser, the aforesaid operation being more fully illustrated in Fig. 9 of the drawings. Simultaneous with the creasing operation the bar is subjected to the downward pressure of a plate, $f$, attached to the lower end of a pendent arm, $g$, which is at its upper end connected to an arm, $h$, fixed to a rock-shaft, $i$, mounted on an elevated portion of the front end of the frame A. The aforesaid pressure on the bar during the process of creasing the same serves to prevent fracture or opening of the iron while being creased. Said rock-shaft receives its motion by a pendent lever, K, secured to the end of the rock-shaft, and resting with its lower extremity against a cam, I, secured to the end of the main shaft B.

The pendent arm $g$ may be operated by other means than oscillating shaft, if found desirable. Said arm is arranged to fall back from its operative position, when required, for the purpose of making a larger opening in the feed-passage, and thus facilitate the removing of obstructions from the front of the creasers, and also allow the operator to push the last blank through the cutters and up to the gage in front of the shoe-former. With the pendent arm $g$, carrying the plate or swage $f$, I connect a lever pivoted to a suitable support back of said plate.

The aforesaid connection of the pendent arm and lever is made by the connecting-rod sliding in the arm $g$, and provided in front thereof with a head, against which the said arm is pressed by a spiral spring, $S''$, surrounding the rod $e'$, and exerting its expansive force against the arm $g$, and a nut on the rod back of the arm, as illustrated in Fig. 9 of the drawings. By means of the lever engaging a notch or suitable catch (not necessary to be here shown) the swage is held in its operative position over the feed-passage, and in the operation of swaging the bar the spring $S'$ yields sufficiently to allow the swage to move laterally with the bar pressed against the creasers.

The lower edge of the plate $f$ is of such a contour as to produce greater pressure on the end portions of the underlying bar than on the central portion thereof, and thereby vertically compress or upset the end portions of the bar, so as to impart to it the usual increased thickness required at the heel of the shoe. If, however, desired, the plate $f$ may be made to bed level on the bar in place of the aforesaid contour, and the swaging performed on the blank after it has passed the cutters.

After the bar has been creased and shaped as aforesaid it is advanced toward the wheel D until it encounters a stop or gage, $m$, situated so as to arrest the movement of the bar in front of the wheel D, and bring the center of the bar across the usual opening, $n$, in the bottom of the feed-channel. Between this opening and the creaser H is a stationary vertically-projecting cutter, $o$, and over the cutter is arranged a vertically-reciprocating cutter, $o'$, carried on the end of a plate, $p$, which lies over the shoe-blank in front of the wheel D, and receives a vertically-reciprocating motion by an arm, $g'$, fixed to the rock-shaft $i$, and connected with the aforesaid plate by a coupling link or rod, $r$. The plate $p$ moves in a vertical guide, $r'$, and in its descent causes the cutters $o$ and $o'$ to sever the bar edgewise, and leave in front of the wheel D a blank of the requisite length to form the horse or mule shoe.

I do not, however, limit myself to the aforesaid arrangement of the cutters, as it is obvious that they may be arranged to cut the bar sidewise, and to be actuated by the slide hereinbefore described.

If desired, the bottom face of the plate $p$ may be made similar to that of the before-described swage-plate $f$, so as to subject the blank to a secondary swaging operation; or the swaging may be performed here and omitted at the place of creasing, which is represented as a primary swaging by the plate $f$. Below the notch or opening $n$, at opposite sides thereof, are two horizontal slides, $s$, on each of which is pivoted a vertical roller, $s'$. Said slides are moved toward and from each other by cams $t$, fixed to horizontal arbors $t'$, which have rigidly connected to them levers $u$, which are adjustable and arranged to bring the horizontal slides closer or wider apart, and cause more or less compression on the side of the shoe when bending it around the former, which adjustment is accomplished by a loose check-pin, $u^2$, interposed between the levers and roller L, and set-screws inserted in the levers and bearing against the back of the check-pieces, as illustrated in Fig. 3 of the drawings. If desired, the co-operating cams $u'$, hereinafter described, may be made to project more or less from the roller L by a liner introduced back of said cams. Between the free ends of the aforesaid levers revolves a roller, L, mounted on the main shaft B. Said roller is provided at opposite sides with cams $u'$, which, in the rotation of the roller, press the levers $u$ $u$ aside, and, in conjunction with a suitable spring or springs pressing the levers toward the rollers, imparts to the arbors $t'$ and cams $t$ an oscillatory movement, and thereby carries the slides $s$, with their roller $s'$, toward and from the former on the wheel D. The cams $u'$ are arranged in such relative positions that after the wheel D has, by its former $b$, pressed the shoe-blank through the notch $n$, and thus bent said blank partly around the former $b$, the slides $s$ are caused to press the periphery of their rollers $s'$ against the heels of the shoe hanging on the former $b$, and thereby completing the bending operation on the shoe.

The periphery of the wheel D is in proximity to the periphery of the roller L, and after the shoe has left the rollers $s'$ it is subjected to the pressure of the aforesaid peripheries, and is thereby flattened, and the metal on the inner edge of the forward portion of the creases in the face of the shoe becomes slightly upset, and thereby changes the pitch of the crease corresponding to the different angles of inclination required for the nail-holes of the shoe.

On the inner sides of the two walls A A, back of the flattening or compressing rollers L, are two rollers, $v$ $v$, which stand in a plane at right angles to that of the wheel D, and have their peripheries in proximity to the sides of said wheel and in position to be traversed by the outer sides of the jaws $c$ $c$ during the rotation of the wheel D. Said rollers $v$ $v$ press the jaws $c$ $c$ against the sides of the shoe riding on the former $b$ and die $a$, and thereby subject the shoe to a final swaging operation, which imparts to it a smooth finish and completes the shoe.

Across the rear end of the frame is secured a bar, M, which serves to press the jaws $c$ $c$ radially back into the wheel, so as to liberate the shoe and allow it to be thrown off or swept from the wheel D by the collision of the shoe with the bar M. Simultaneously with this operation the former $b$ is caused to recede into the wheel D by the following instrumentalities:

To the stem of the former $b$ is attached at right angles an arm, W, which projects through slots in the side of the wheel and in the adjacent jaw $c$, and has journaled on its outer end a roller, N, which, in the rotation of the wheel D, is caused to traverse a cam, R, fixed to the inner side of the frame A, which cam is eccentric in relation to the axes of the wheel D, so that by its pressure on the roller N the former $b$ is crowded back into the wheel, and thus caused to loose its hold on the shoe during the aforesaid operation of throwing the shoe off from the wheel, as illustrated in Fig. 7 of the drawings.

The operation of the machine is briefly as follows: The bar from which the shoes are to be made is fed into the machine in a heated state. It is inserted into the guide or feed channel $d$ to a sufficient length for the first blank, which is then creased and swaged. The next impulse of the feed carries the bar forward to bring the first blank up to the gage $m$, and in position for the action of the former. The second blank on the bar is then subjected to the action of the creaser and swage of the machine while the first blank is cut off. By the time this is effected the revolving wheel D brings around the former $b$, which carries down and bends the first blank by first pressing it through the notch $n$, and then between the rollers $s'$, which latter completes the bending of the shoe. After leaving the rollers $s'$ the rotating wheel carries the shoe to receive the impact of the face of the roller L, which flattens out the shoe, and thence the shoe is carried around to where it receives a lateral compression by the encounter of the jaws $c$ $c$ with the rollers $v$, and finally the shoe encounters the throw-off device M, which delivers the completed shoe from the machine.

The advantages of my present invention over the machine described in the patent to D. J. and S. Farmer, dated June 28, 1881, reside in the employment of the rotary or continuous-acting wheel, on which a series of sets of dies and formers may be mounted, so as to form several horseshoes during one revolution of the said wheel, and the cams G and I may be shaped to correspondingly accelerate the actions of the creasing and swaging mechanisms, and inasmuch as the momentum of the rotating die and former carrier contributes to the power of the machine, the capacity of the machine is greatly augmented by the employment of the within-described combination of mechanisms.

Having described my invention, what I claim as new, and desire to secure by Letters Patent, is—

1. In a horseshoe-machine, a rotary wheel carrying shoe-formers and dies, in combination with preliminary creasers arranged in feed-passage to said shoe-former and die, whereby the creasing is performed on a line with the bar before bending, as set forth.

2. In a horseshoe-machine, a rotary wheel carrying shoe-formers and dies, in combination with creasing and swaging mechanisms arranged in the feed-passage to said wheel, die, and former, substantially as set forth and shown.

3. In a horseshoe-machine, a rotary wheel carrying one or more formers, in combination with creasers arranged to crease the blank in its passage to the former and cutters, substantially as set forth.

4. In a horseshoe-machine, a rotary wheel carrying one or more formers, in combination with creasers, a slide for pressing the blank against the creasers, and cutters for severing the blank, as specified.

5. In combination with the rotating wheel carrying in its periphery a shoe-former and die and a blank-supporting bed or channel arranged transversely in front of the periphery of said wheel, a stationary cutter on said bed, and a vertically-reciprocating cutter arranged over the bed to cut the blank edgewise, substantially as specified and shown.

6. In combination with the rotary wheel carrying the shoe-former and a stationary bed arranged across the periphery of said wheel and provided with a stationary vertical cutter, a rock-shaft above said bed provided with a radial arm, and a vertical pressing-plate connected to the free end of said arm and carrying on its lower end a cutter coinciding with the stationary cutter, substantially as described.

7. In combination with a rotary wheel and horseshoe-formers mounted thereon, horizontal slides arranged at opposite sides of the wheel at the periphery thereof, shoe-bending rolls pivoted on the slides, arbors having cams engaging with the slides, levers connected to the arbors, and a rotary wheel or roller having projecting from opposite sides cams engaging the levers, substantially as set forth.

8. The combination, with the vertically-revolving wheel, of the shoe-former and die carried on the periphery of said wheel, laterally-movable jaws at the outside of the die, and compressing-rollers secured to the frame of the machine at opposite sides of the aforesaid wheel, substantially as shown and described.

9. In combination with the rotary wheel carrying shoe-formers, dies, and yielding jaws at the side of the dies, a throw-off bar secured across the frame of the machine and lying in proximity to the periphery of the aforesaid wheel, for sweeping from the latter the completed shoe, substantially as set forth.

In testimony whereof I have hereunto signed my name and affixed my seal, in the presence of two attesting witnesses, at Syracuse, in the county of Onondaga, in the State of New York, this 12th day of February, 1884.

DAVID J. FARMER. [L. S.]

Witnesses:
FREDERICK H. GIBBS,
WM. C. RAYMOND.